United States Patent [19]

Deprez et al.

[11] 3,795,143
[45] Mar. 5, 1974

[54] MACHINE FOR RUNNING TOGETHER BEVEL OR HYPOID GEARS TO DETERMINE OPTIMUM RUNNING POSITION OF ONE GEAR RELATIVE TO ANOTHER

[75] Inventors: Thomas A. Deprez; Frank M. Whalley, both of Rochester, N.Y.

[73] Assignee: Gleason Works, S.A., Baudour, Belgium

[22] Filed: Sept. 13, 1972

[21] Appl. No.: 288,636

[52] U.S. Cl. .............................. 73/162, 33/179.5 B
[51] Int. Cl. ......................................... G01m 13/02
[58] Field of Search... 73/162; 33/179.5 R, 179.5 B, 33/179.5 A, 179.5 C, 179.5 D, 179.5 E

[56] References Cited
UNITED STATES PATENTS
2,961,873  11/1960  Carlsen .............................. 73/162
1,911,435  5/1933  Condon .............................. 73/162

Primary Examiner—Jerry W. Myracle
Assistant Examiner—Denis E. Corr
Attorney, Agent, or Firm—Ralph E. Harper

[57] ABSTRACT

A gear testing machine is provided with a manual adjustment means for adjusting position of one gear of a pair relative to another gear of the pair while the gears are running together in meshing engagement. The manual adjustment means includes a safety feature which prevents running engagement of the pair of gears unless the operator of the machine has each hand in place on control switches which must be simultaneously actuated before the machine can be started.

10 Claims, 7 Drawing Figures

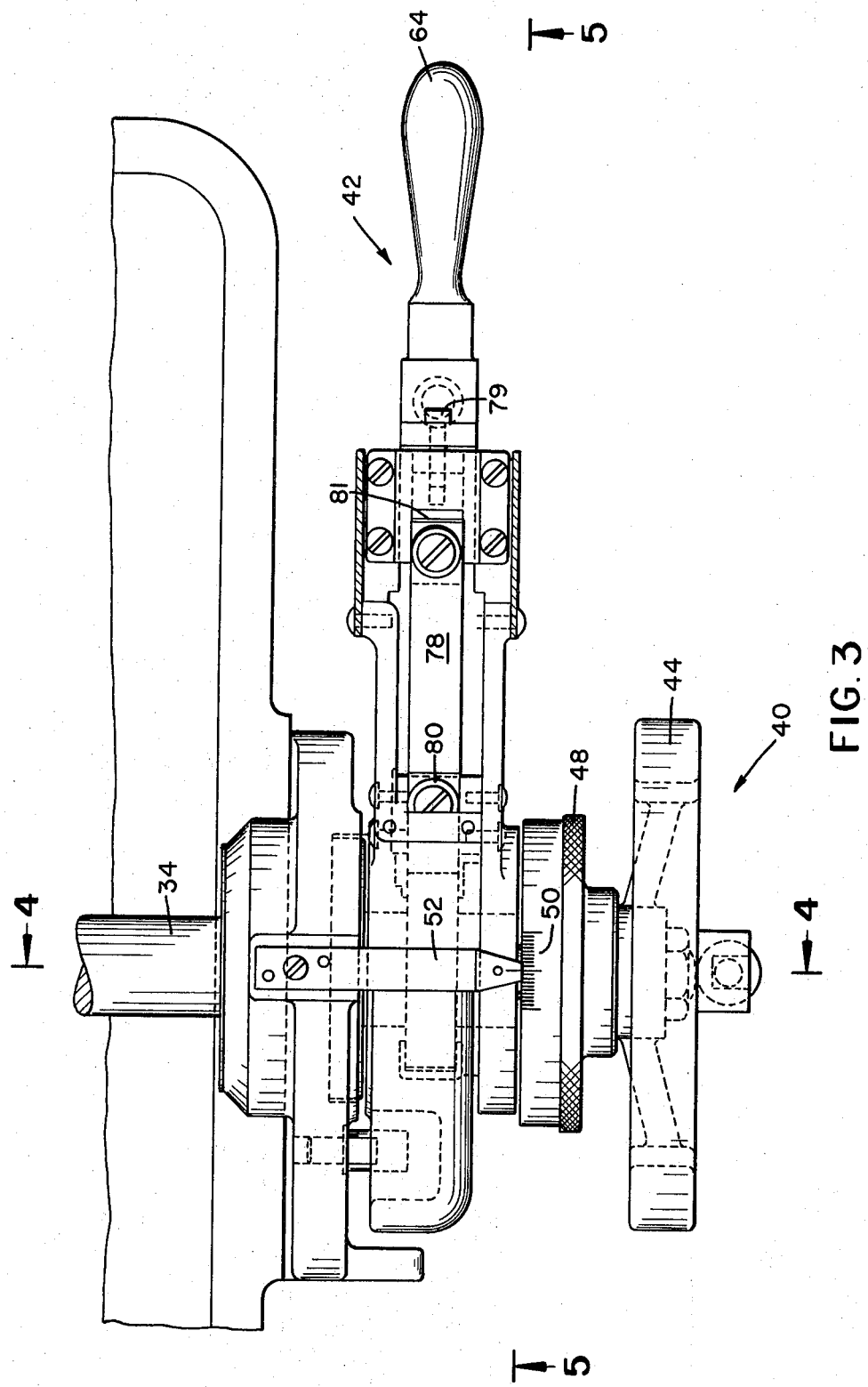

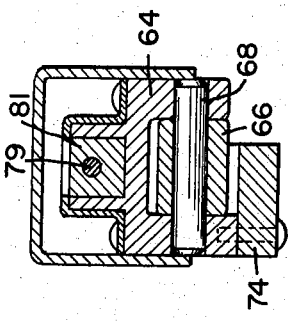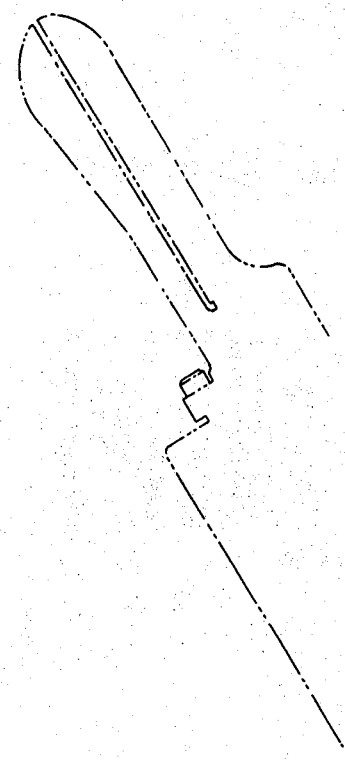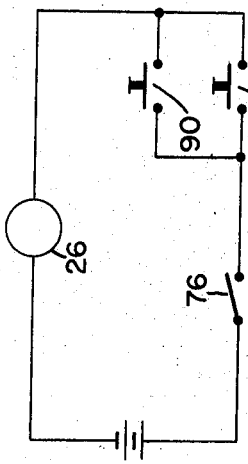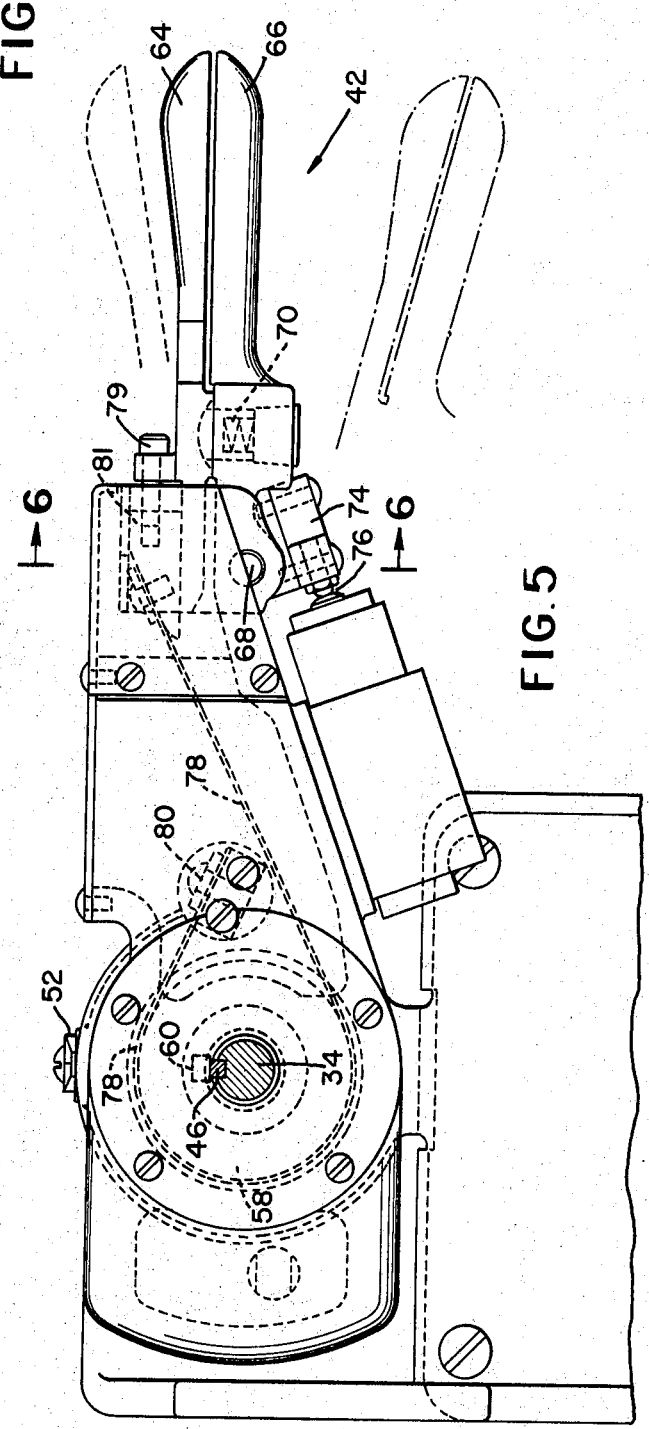

MACHINE FOR RUNNING TOGETHER BEVEL OR HYPOID GEARS TO DETERMINE OPTIMUM RUNNING POSITION OF ONE GEAR RELATIVE TO ANOTHER

BACKGROUND AND BRIEF DESCRIPTION OF INVENTION

This invention relates to machines of a well known type which are designed for running together pairs of bevel or hypoid gears for the purpose of testing such gears as to their running qualities, tooth bearing contact, and the like, or for smoothing or finishing the gears by lapping, honing, burnishing or like operations. The gears of the pair may both be work gears, such as a gear and pinion pair, or one of them may be a work gear and the other a master gear or a gear shaped tool. The present invention is especially concerned with providing for safety improvements which permit an operator to safely carry out manual adjustment of position of one gear of a pair relative to the other gear of the pair while the two gears are in running engagement.

There is a substantial body of prior art on the general form and function of machines which are the subject of this specification. Typically, prior arts machines have varied from relatively simple designs which include manual adjustment means for carrying out initial and final positioning of one gear relative to another for testing or treating such gears while in running engagement with one another, to relatively complex designs which automatically bring a pair of gears into running engagement for testing or treating purposes. A representative, and by no means exhaustive, listing of prior art on this general subject includes U.S. Pat. Nos. 1,909,088; 2,111,170; 2,961,873; 3,069,813; 3,099,901; 3,176,512; and 3,528,286, as well as numerous other patents by Oliver F. Bauer.

The present invention is directed to testing and treating machines of relatively simple design which provide for manual adjustment of the position of one gear relative to another while the two gears are in running engagement. The machine of this invention can be used for testing running qualities of a pair of gears, such as a pinion and gear set used in motor vehicle differential assemblies, after the gear pieces have been manufactured and before they are installed in a final assembly. The machine can be set up to establish a theoretical meshing relationship between a pair of gears, as based upon calculations and prior testing of similar gear sets, and the theoretical setting can be obtained by bringing a pair of gears into mesh and then manually rotating a screw adjustment means for advancing one gear along the axis of its mate until a theoretical setting is reached. The theoretical setting can be read from a vernier scale which is adjusted to give a zero readout when the theoretical setting has been reached. Although the zero readout position represents a theoretically correct relationship between a pair of gears, it is necessary to carry out further increments of precise adjustment between the gears of the pair in order to determine an optimum meshing engagement for the particular set of gears being tested. This type of testing is referred to as "pinion cone searching" and involves a determination of optimum running position of a pair of gears as detected by a relatively low noise level which is produced when the gears have reached a smooth running engagement with one another. After the optimum meshing engagement has been determined, the operator can read off the adjustment which has been made in comparison to the initial theoretical positions of the gears, and this information is recorded and used in installing the gear set in an actual assembly.

Unlike prior arrangements, which permit the operator to reach into the meshing area of a pair of gears while the machine is running, the present invention requires that both hands of an operator be occupied in spaced apart positions to actuate switches required for an operation of the machine. This prevents a running engagement of the two gears until such time as two separate switches are simultaneously held in positions for closing a circuit for the machine, and the operator must use both hands to actuate the switches. One of the two switches is associated with a manual adjustment means which functions to carry out pinion cone searching after the gears have been brought into a theoretical running positions relative to one another. This permits the operator to continue final adjustment of position of one gear relative to the other to determine optimum running information without endangerment to the operator.

The specific improvements of the present invention include a first manual adjustment means for adjusting the position of one gear relative to another to establish a theoretical setting between the two gears prior to running the gears together and a second manual adjustment means for further adjusting the position of the one gear relative to the other while the pair of gears is in running engagement. The second manual adjustment means includes an actuating means for changing its condition from an inoperative condition, in which the machine cannot be operated to run the pair of gears together, to an operative condition in which the gears can be run together while an adjustment is being made.

In a specific embodiment of the invention, the first and second manual adjustment means are each operatively associated with a single worm member for effecting a movement of housing structure in which one of the gears is carried. The second manual adjustment means includes a hand grip means having a first handle portion and a second handle portion, with the first handle portion being mounted for movement about a pivotal axis relative to the second handle portion so that the two portions can be squeezed together to change the condition of the second manual adjustment means from inoperative to operative. The first handle portion includes an engaging means for releasably engaging the second manual adjustment means with the worm member which must be rotated to effect adjustment. An electrical switch means is operatively associated with the hand grip of the second manual adjustment means, and the electrical switch is actuated to close a circuit required for operation of the machine when the two handle portions are squeezed together to carry out final adjustment of one gear relative to the other while the gears are running together in mesh.

These and other features and advantages of the present invention will be more fully appreciated in the detailed discussion which follows. In that discussion reference will be made to the accompanying drawings, as briefly described below.

BRIEF DESCRIPTION OF DRAWINGS

FIG. 3 is a top plan view, in enlarged scale, of first and second manual adjustment means associated with the machine illustrated in FIG. 1;

FIG. 5 is a side elevational view of the structures shown in FIG. 3 as seen on line 5—5 thereof;

FIG. 6 is a cross sectional view of a portion of the second actuating means of FIG. 5 as seen on line 6—6 thereof; and FIG. 7 is a highly simplified circuit diagram for a basic drive circuit associated with the manual adjustment means of the machine of this invention.

DETAILED DESCRIPTION OF INVENTION

Figure 1:
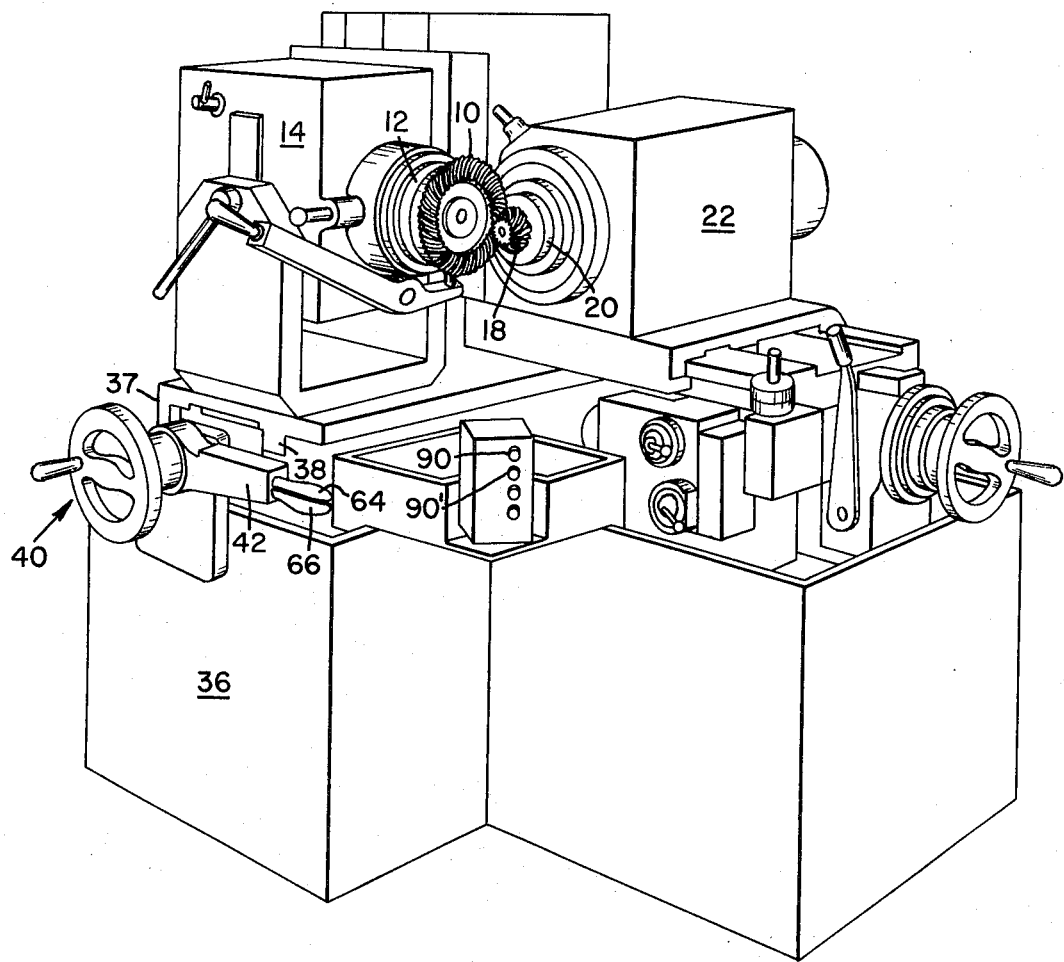
FIG. 1 is a perspective view of the type of machine to which the improvements of the present invention are applied.
Figure 2:
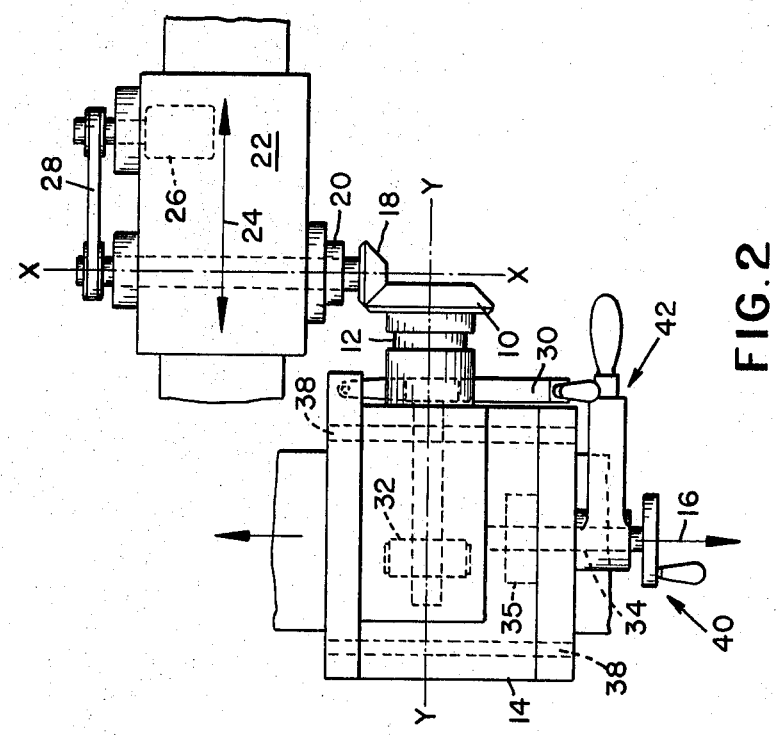
FIG. 2 is a top plan diagrammatic outline of basic relationships between components of the machine illustrated in FIG. 1.

FIGS. 1 and 2 illustrate basic relationships which are known in prior art testing machines of the type contemplated herein. In such machines, a first gear 10 is mounted on a spindle 12 carried within a housing or column 14 which can be advanced or retracted along an axis 16 (see FIG. 2). A second gear 18 is likewise mounted on a spindle 20 carried within a housing structure or column 22 which can be advanced and retracted along an axis 24 (see FIG. 2). Thus, the two gears can be mounted on their respective spindles and then brought into meshing engagement by an advancement of one of the housings relative to the other. In the illustrated machine, which is of a type for running together a gear (the first gear 10) and a pinion (the second gear 18), means (not shown) are not provided for bringing the two gears into meshing engagement by an advancement of the housing 22 along the axis 24 (which is parallel to the Y—Y axis of the first gear 10). Machines of this type usually include hydraulic means for bringing a pair of gears into initial engagement, and means may be provided for rotating one or both of the gears during initial meshing to make sure that the gears mate with one another.

After the pair of gears has been brought into meshing engagement, the gears may be run together by applying a driving moment to one of the gears, and the driving moment is then imparted to the other gear of the pair. In the illustrated arrangement of FIG. 2, the second gear 18 is driven with a drive motor 26 interconnected to the second gear 18 by way of a drive belt 28 and the spindle 20 upon which the gear 18 is mounted. This driving moment is applied to the first gear 10 and its spindle 12. A known braking means 30 may be operatively associated with the driven spindle 12 for applying a variable brake load to the spindle as the gears are running together. In addition, a second braking means 32 may be provided for selectively applying a relatively light drag to the spindle 12 and its associated first gear 10 during running engagement of the two gears. With this arrangement, the machine can be used for various testing and treating operations which require a running engagement of the two gears with one of the gears being driven and the other being braked.

The type of testing operation with which the present invention is concerned is one of providing for "pinion cone searching" during running engagement of the gears 10 and 18. This operation requires a provision for precise adjustment of the gear 10 along a path of travel which is parallel to the axis X—X of the gear 18 so that an optimum running condition for the gear 10 can be determined by changes in noise level produced during such running engagement and adjustment. This type of testing is well known and has been carried out both manually and automatically, as described, for example, in U.S. Pat. No. 3,528,286. The machine of the present invention is of a type which provides for manual adjustment of the gear 10 relative to the gear 18 during running engagement of the two gears to determine an optimum position of the gear 10 relative to the gear 18.

Generally, manual adjustment of the gear 10 relative to the gear 18 is effected by rotation of a worm member 34 (see FIG. 2) which is threaded through a structure 35 secured to the housing 14 so as to advance or retract the housing 14 relative to a base 36 (see FIG. 1) as the worm member is rotated in one direction or the other. The housing 14 is mounted relative to the base 36 so as to move on slide ways 38 between the two structures, and this overall arrangement is well known and is not a separate part of the present invention. Similar arrangements have been proposed in certain of the prior art patents mentioned above, and descriptions of those patents showing such arrangements are incorporated herein by reference to the extent necessary to provide a background understanding of the various ways in which one gear of a pair can be adjusted relative to the other gear of the pair along a line which is parallel to the axis of the other gear. FIG. 2 shows a first manual adjustment means 40 for rotating the worm member 34 to establish a theoretical setting between the pair of gears prior to running the gears together, and, in addition, there is shown a second manual adjustment means 42 which can be releasably engaged with the same worm member 34 for further adjusting the position of the gear 10 relative to the gear 18 while the gears are running together. As will be discussed in greater detail below, the second manual adjustment means 42 includes a safety feature which prevents operation of the machine while adjustment is being carried out with the worm member 34 until the condition of the second manual adjustment means has been changed from an inoperative one to an operative one.

FIGS. 3–6 illustrate details of construction and assembly of the first and second manual adjustment means 40 and 42 which are used for determining optimum running positions for a pair of gears.

Figure 4:
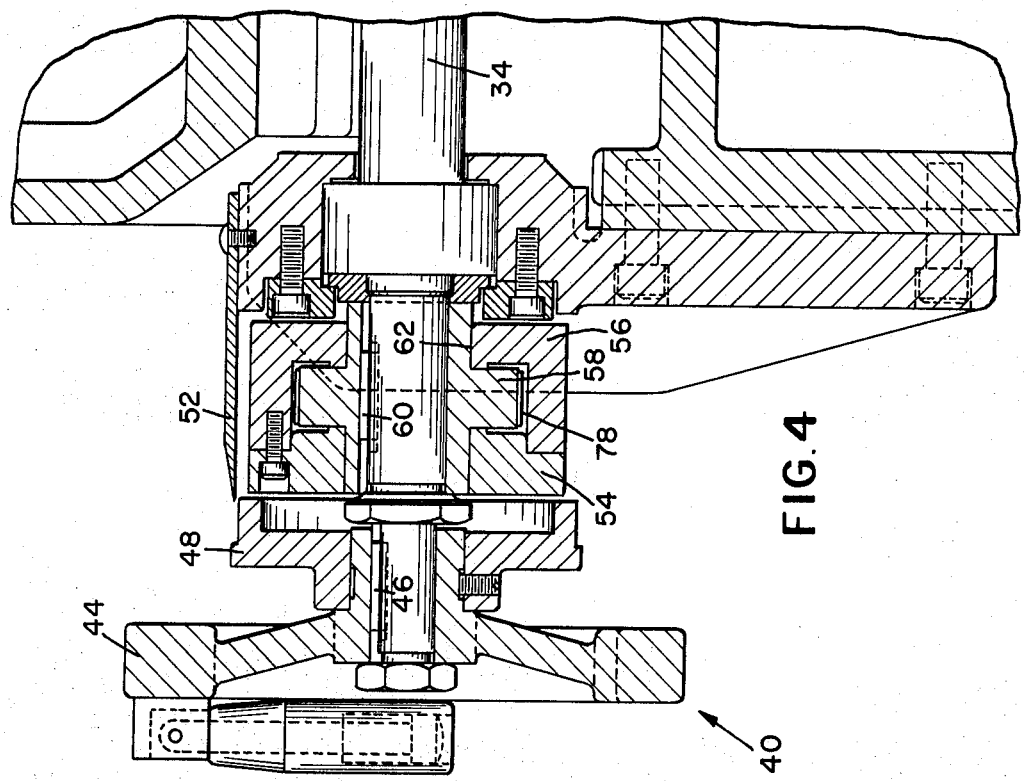
FIG. 4 is an elevational view, in cross section, as taken on line 4—4 of FIG. 3.

As shown in FIGS. 3 and 4, the and 4, manual adjustment means 40 includes a hand wheel 44 secured to an extension of the shaft which makes up the worm member 34. The hand wheel 44 is secured with a key 46 inserted in a key way formed in a reduced diameter, terminal end portion of the worm member shaft so that manual rotation of the hand wheel 44 imparts a direct rotation to the worm member 34. The worm member shaft is mounted in suitable bearings (not shown) and lubricated in a well known manner to provide for ease of rotation of the worm member to effect position changes in the gear 10. The first manual adjustment means also carries a collar element 48 upon which a scale 50 is inscribed for providing a read out of position of the manual adjustment means relative to a pointer element 52 carried on a non-rotating portion of the assembly.

In use, the first manual adjustment means 40 functions to adjust the position of the first gear 10 relative to the second gear 18 prior to operation of the machine to run the gears together. In fact, the drive motor 26 of the machine cannot be operated while the first manual adjustment means 40 is being used by an operator since its control circuit remains open until the operator removes his hands from the first manual adjustment means 40 and actuates the second manual adjustment means 42. The first manual adjustment means 40 is used to establish a theoretical or nominal setting of the positions of gears 10 and 18 as determined from previous calculations for similar gear sets. This setting can be established with the aid of the scale 50 which has been previously adjusted in its relationship to the hand wheel 44 to provide a zero read out when the theoretical setting for the gears has been attained.

After theoretical setting of the gear pair has been established with the first manual adjustment means 40, final adjustment is carried out while the gears are running together so that changes in noise level during operation can be detected by the operator. This final adjustment requires carefully controlled and precise increments of change in position of one gear relative to the other, and for this purpose, the second manual adjustment means 42 is in the form of a relatively long lever arm which allows very small rotational moments to be manually imparted to the same worm member 34 which was initially adjusted to bring the gear pair into a theoretical setting. FIGS. 3–6 each disclose details of construction and assembly of the second manual adjustment means 42.

As shown in FIGS. 3–5, the second manual adjustment means 42 comprises an assembly which is mounted to normally freely rotate relative to an extended portion of the worm member 34. The assembly includes sections 54 and 56 which are secured together, as shown in FIG. 4, to enclose a pulley means or other cylindrical surface formation 58 secured to the worm member shaft by a key 60. The sections 54 and 56 ride on lubricated surfaces 62 of the element 58 so as to freely rotate relative to the element 58 until such time as the second manual adjustment means is actuated to be brought into positive driving engagement with the worm member.

The second adjustment means 42 further comprises a hand grip means having a first handle portion 64 and a second handle portion 66. The second handle portion 66 is fixed to the sections 54 and 56 of the main body of the manual adjustment means so as to rotate the sections 54 and 56 about the axis of the worm member 34 when the handgrip is moved by an operator. The first handle portion 64 is mounted for movement about a pivot axis through a pivot pin 68 relative to the second handle portion 66. As shown in FIG. 6, the pivot pin secures the first handle portion 64 to the second handle portion 66 and provides for relative movement therebetween. A spring member 70 (FIG. 5) normally urges the first handle portion 64 upwardly away from the second handle portion 66.

The first handle portion 64 functions as an actuating means for changing the condition of the second manual adjustment means 42 from an inoperative condition, in which the machine cannot be operated to run the pair of gears together, to an operative condition in which the gears can be run together while an adjustment is being made. This is accomplished by providing means in association with the first handle portion 64 for (a) closing a circuit which must be completed for simultaneous operation of a switch which brings the drive motor 26 into operation, and for (b) engaging the normally disengaged manual adjustment means 42 with the screw member 34. In order to close a circuit for operation of the machine, the first handle portion 64 carries a switch element 76 on a mounting block 74 so that the switch element closes a circuit when the mounting block is pivoted with the handle portion 64 to the position shown in FIG. 5. FIG. 7 indicates the switch 76 which must be closed to partially complete a control circuit for the machine, and this switch is the one actuated by movement of the handle portion 64 to the position shown in FIG. 5 where the two handle portions 64 and 66 have been squeezed together by an operator.

As the first handle portion 64 is squeezed toward the second handle portion 66, it also functions to bring the first manual adjustment means 42 into operative engagement with the worm member 34. As shown in FIG. 5, a band member or strap 78 extends from the movable handle portion 64, around the cylindrical surface of the structure 58, and to a fixed-position mounting block 80 carried within the assembly. When the first handle portion 64 is in a disengaged position relative to the second handle portion 66, the band member 78 is relatively slack and does not make a frictional engagement with the cylindrical surface of the structure 58. However, when the first handle portion 64 is squeezed toward the second handle portion 66, the band member 78 is drawn into tight frictional engagement with the cylindrical surface formation, thereby allowing rotational movement to be applied to the worm member 34 as the squeezed-together handle portions 64 and 66 are moved up or down by an operator. Thus, a squeezing together of the two handle portions of the second handle adjustment means results in a positive engagement of the adjustment means with the screw member 34 to be rotated and in a closing of a circuit which is required before a second switch can be actuated to operate the drive motor 26 to drive the meshed gears mounted in the machine. Tension on the band member 78 can be adjusted with a screw 79 which adjusts the position of a mounting block 81 that carries one end of the band member.

As shown in FIG. 7, the second switch 90 comprises a push button for driving the drive motor 26 in a forward direction and a similar push button switch 90' may be used for reversing the drive motor to reverse the direction of rotation of the gears being run together. As shown in FIG. 1, the switches 90 and 90' are located in positions where they can be actuated by the right hand of an operator while his left hand is squeezing the handle portions 64 and 66 of the second manual adjustment means. Thus, both hands of the operator are occupied, and there is no danger that one hand may reach into the area where the gears are mounted while they are running together.

In use of the machine, an operator mounts the gears 10 and 18 on their respective spindles 12 and 20. Then, the gears are brought together by an advancement of the gear 18 along the axis 24 with a hydraulic control system which is not illustrated. After bringing the gears together, the first manual adjustment means 40 can be used to establish a theoretically correct positioning of the gears, and the second manual adjustment means 42 can be used to search for an optimum setting for the gears in the manner discussed above.

Having described the structional and functional features of a specific embodiment of the machine of this invention, it can be appreciated that the principles of the invention can be applied to similar and other types of machines requiring the type of running engagement of a pair of gears and adjustment of same offered by the disclosed machine. Such applications of the principles of this invention are considered to be within the scope of the invention as defined in the claims below.

What is claimed is:

1. In a machine of a type for running together a pair of gears and which includes a manual adjustment means for changing the position of a first gear of the pair in the direction of the axis of rotation of a second gear of the pair, while the pair of gears is in meshing engagement, so as to determine an optimum running position for the pair of gears, the improvement in said manual adjustment means comprising:
    a first manual adjustment means for adjusting the position of said first gear in the direction of the axis of rotation of the second gear to establish a theoretical setting between the pair of gears prior to running the gears together, and
    a second manual adjustment means for further adjusting the position of said first gear relative to the second gear while the pair of gears is in running engagement, said second manual adjustment means having actuating means for changing the condition of said second manual adjustment means from an inoperative condition, in which the machine cannot be operated to run the pair of gears together, to an operative condition in which the gears can be run together while an adjustment is being made.

2. The machine of claim 1 wherein each gear of said pair is mounted on its own spindle means carried within an associated housing structure, and wherein said first manual adjustment means includes a worm member which is rotated by the first adjustment means to effect a movement of the housing structure of one of the gears relative to the other gear of the pair.

3. The machine of claim 2 wherein said second manual adjustment means can be brought into engagement with said worm member, when in its operative condition, for rotating the worm member to effect adjustment of one of said gears.

4. The machine of claim 3 wherein said actuating means of said second manual adjustment means includes
    a handgrip means having a first handle portion and a second handle portion, with said first handle portion being mounted for movement about a pivot axis relative to said second handle portion so that the two portions can be squeezed together to change the condition of the second manual adjustment means to an operative condition.
    engaging means connected to said first handle portion for engaging structure associated with said worm member when said first handle portion is squeezed toward said second handle portion,
    electrical switch means operatively associated with said handgrip means for being actuated by a squeezing together of said first and second handle portions, said electrical switch means functioning, when actuated, a circuit which permits operation of the machine to run said pair of gears together in meshing engagement with each other.

5. The machine of claim 4 wherein said circuit includes a separate control switch for actuating a drive motor that drives one of the gears of said pair.

6. The machine of claim 4 wherein said engaging means includes a band member which is drawn into tight frictional engagement with a cylindrical surface formation of said worm member when said first handle portion is moved about its pivot axis toward said second handle portion, said band member being connected to said first handle portion for movement therewith.

7. The machine of claim 6 and including means for adjusting tension of said band member.

8. The machine of claim 4 and including spring means for normally urging said first and second handle portions away from each other.

9. In a machine having a drive motor means for driving a first gear of a pair in mesh with a second gear of the pair for the purpose of testing running engagement of the pair of gears, the improvement comprising
    a control circuit including said drive motor means and having a first switch means for starting and stopping the drive motor means when the control circuit is closed,
    a second switch means included in said control circuit and operatively associated with an adjustment means which functions to adjust the position of said first gear relative to said second gear while the gears are running together, and
    a power source included in said control circuit in such a way that said adjustment means cannot be operated until both of said first and second switch means are manually actuated and manually held in closed positions to close the control circuit.

10. The improvement of claim 9 wherein said adjustment means includes a handgrip means which must be grasped by one hand of an operator to close said second switch means while the other hand of the operator is held on said first switch means.

* * * * *